United States Patent
Jiang et al.

(10) Patent No.: US 10,692,246 B2
(45) Date of Patent: Jun. 23, 2020

(54) GEOMETRY SEQUENCE ENCODER AND DECODER

(71) Applicant: HypeVR, San Diego, CA (US)

(72) Inventors: Caoyang Jiang, San Diego, CA (US); Jason Juang, San Diego, CA (US); Anthony Tran, San Diego, CA (US); Jiang Lan, San Diego, CA (US)

(73) Assignee: HypeVR, San Diego, CA (US)

( * ) Notice: Subject to any disclaimer, the term of this patent is extended or adjusted under 35 U.S.C. 154(b) by 97 days.

(21) Appl. No.: 15/725,672

(22) Filed: Oct. 5, 2017

(65) Prior Publication Data

US 2018/0096495 A1    Apr. 5, 2018

Related U.S. Application Data

(60) Provisional application No. 62/404,310, filed on Oct. 5, 2016.

(51) Int. Cl.

| | |
|---|---|
| *G06T 9/00* | (2006.01) |
| *H04N 19/13* | (2014.01) |
| *H04N 19/172* | (2014.01) |
| *H04N 19/44* | (2014.01) |
| *G06T 15/08* | (2011.01) |
| *G06T 19/00* | (2011.01) |

(52) U.S. Cl.
CPC ............... *G06T 9/00* (2013.01); *G06T 9/001* (2013.01); *G06T 15/08* (2013.01); *G06T 19/006* (2013.01); *H04N 19/13* (2014.11); *H04N 19/172* (2014.11); *H04N 19/44* (2014.11)

(58) Field of Classification Search
CPC ......... G06T 9/00; G06T 19/006; H04N 19/13; H04N 19/44; H04N 19/172
See application file for complete search history.

(56) References Cited

U.S. PATENT DOCUMENTS

| | | | |
|---|---|---|---|
| 2004/0047415 A1* | 3/2004 | Robert ................ | H04N 19/543 375/240.01 |
| 2010/0045670 A1 | 2/2010 | O'Brien et al. | |
| 2011/0285708 A1 | 11/2011 | Chen et al. | |
| 2012/0262444 A1 | 10/2012 | Stefanoski et al. | |
| 2014/0111529 A1 | 4/2014 | Clemie et al. | |

OTHER PUBLICATIONS

Yang et al: "Compression of 3-D Triangle Mesh Sequences Based on Vertex-Wise Motion Vector Prediction", IEEE, 2002. (Year: 2002).*
World Intellectual Property Organization, International Search Report and Written Opinion for International Application No. PCT/US2017/055364, dated Dec. 14, 2017, 9 total pages.

* cited by examiner

*Primary Examiner* — Ruiping Li
(74) *Attorney, Agent, or Firm* — SoCal IP Law Group LLP; Jonathan Pearce

(57) ABSTRACT

There is disclosed a system and method for encoding and decoding a geometry sequence. The method includes performing intraframe and interframe comparisons of geometry within the geometry sequence, selecting one or more faces as index faces and encoding only the index faces, and the differences relative to those index faces as a bit stream for transmission. The method further includes enabling decoding of the faces based upon the prediction type and encoding method selected during the encoding process.

19 Claims, 6 Drawing Sheets

GEOMETRY SEQUENCE ENCODER AND DECODER

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from U.S. provisional patent application No. 62/404,310 filed Oct. 5, 2016 and entitled "Geometry Sequence Encoder and Decoder."

BACKGROUND

Field

This disclosure relates to a geometry sequence encoder and decoder.

Description of the Related Art

Computer graphics have advanced dramatically from the earliest, basic two-dimensional graphical representations through to modern, complex, highly-detailed, three-dimensional graphics with dynamic lighting, shadows, particle effects, realistic physics, destructible environments, and other elements that increase realism and immersion.

More recently, virtual reality and augmented reality have begun to inject these complex three-dimensional graphics into reality or to replace reality altogether with virtual environments. Virtual reality and augmented reality typically present multiple "views" of a single scene, one for each eye. These views are presented in such a way that perspective, as understood by the human brain, perceives the location to be "real" or as close to real as the designers of these environments can create. The increased immersion of "being within" a virtual environment is yet another significant advance in computer graphics and in the merger of human perception with computer generated worlds.

Many virtual and augmented reality environments are rendered in real-time from computer graphics data. These types of environments are most-closely related, from a technological standpoint, with computer games. Virtual environments and objects are created by computer graphics editing software and modeling software.

Turning to FIG. 1 is an example of a triangular pyramid formed by a set of vertices making up a total of four faces. Objects in three-dimensional computer environments are typically described as a set of (x, y, z) vertices 110, 112, and 114, each of which describes a point in open space. These vertices 110, 112, and 114 may be connected to other vertices to form a "face," such as face 120. As a result, typical virtual environments and objects with them are formed from a large set of triangles made up of a set of three vertices which, in combination, define a "face." As can be understood, many faces may be combined into representations of virtually any shape within a virtual environment.

Additional data may be used to describe vertices, for example, to define or identify the location of a color or texture map for one or more faces associated with a vertice. This may be appended to the (x, y, z) coordinates as (x, y, z, u, v) where the (u, v) may act as an index for accessing color information (e.g. a color component) in an associated texture map.

A "face," like face 120, is a flat triangle (typically) forming part of an environment or object. For example, a simple cube or box in a virtual environment, if it has no significant depth features, may be formed by twelve triangles. In such a formation, there are two, isosceles, congruent triangles for each of the six sides of the cube or box. The triangles have angles of 45°, 45°, and 90°. When combined with no seams and with the longest side (opposite the 90° angle), such triangles form a square. When six such squares are combined at right angles in each corner, with all triangles the same size, a cube or box is formed. Color data may be imposed on each face, either as a solid color or as a "texture" which may be a bitmap or video for that face. Clever combination of these bitmaps or videos result in objects that appear in a fashion similar to the corresponding real objects (e.g. a wooden crate or a six-sided dice).

More complex shapes, such as human bodies, lamps, tables, doors, and trees can be formed by smaller triangles combined in such a way as to create appropriate "faces" that appear to be the desired shape. In early computer graphics of this type, few triangles were used because each set of vertices increases the necessary computational power in order to render the associated models with any reasonable speed. As time has gone on and as graphical processing power has increased, the number of triangles has increased to such a degree that the associated triangles are now tiny, almost imperceptible, and millions in number. Still, most graphics of this type are rendered on a computer containing all of the data necessary for rendering an associated model. This ready access to the models enables real-time processing such that a user can experience a complex game or virtual reality environment operating from his or her computer on his or her screen or virtual reality headset.

In response to the rise of virtual reality and augmented reality, various experiences have been created based upon three hundred and sixty degree video or still images. These videos typically create an effective sphere of images (either still or a series of video frames) that are stitched together to form a sphere around the perspective of a viewer at that location. So, for example, a user may tour the Temple Mount in Israel by "walking through" the Temple Mount as an experience based upon a three hundred and sixty degree camera that was, itself, walked through the actual Temple Mount while recording. Thereafter, a user donning a VR headset can follow that same path and be presented with a series of still images in different locations where he or she may look around in a full sphere or through a moving video in which the individual in the VR headset is inserted so that he or she may look around the spherical images as he or she is moved from place to place based upon the choices made by the original photographer.

These types of spherical still images or video are useful, and relatively simple to create, but they do not feel particularly interactive. In part, this is because they lack any depth information at all. One is literally within a "bubble" of images and every object represented in those images is at the same distance to a viewer's eyes. If one were to lean over, or to stoop down, the images would not alter, there would be no parallax, and the image would effectively be the same. Despite the positive aspects of this technology, this lack of depth information contributes to the feeling of not being in the location and breaks immersive experience.

In contrast, the assignee of this patent has created a system for creating "volumetric video" which is video that includes depth information. That system may be better understood with reference to U.S. Pat. No. 9,369,689 and its related patents. In short, a similar filming process is used, but depth data from a LIDAR or other depth sensor is incorporated so as to generate three-dimensional models for at least some of the objects within a filmed scene. As a result, a user experiencing a scene filmed in this way may "look under" or move his or her head around to obtain different perspectives on objects. Parallax is maintained. Though the scenes are presented as video, the video is attached to the objects that have actual three-dimensional volume within the space so as to create a much more immersive experience for a viewer.

As used herein, the phrase "volumetric video" means live-action, 4 pi steradian video of a real-life scene that incorporates at least one object having a unique depth, other than the horizon depth, that is captured in three-dimensions, according to depth data captured during the creation of the volumetric video. Volumetric video expressly excludes spherical video including only a single depth (e.g. the sphere of stitched-together images) or that lacks any three-dimensional depth information for any object within the scene.

The phrase "geometry sequence" means an ordered set of geometric shapes that make up one or more objects and represent the motion and transformation of those objects over the course of a set time Like video, a "geometry sequence" has frames that are intended to be viewed in a set order. A geometry sequence frame may correspond directly to a volumetric video frame. "Geometry data" defines the objects within a particular frame of a geometry sequence. Volumetric video typically includes a geometry sequence, which makes up the three-dimensional objects shape and location within the volumetric video. In the case of volumetric video, the ordered set is one set of geometric data per frame of the geometry sequence, where there is at least one frame of the geometry sequence per frame of volumetric video. Though envisioned as a component of a volumetric video, a geometry sequence could be used for other purposes, for example, for a computer graphics cutscene in a video game, virtual reality or augmented reality system.

As can probably be expected, the resulting data to store the geometry sequence and associated high-definition video for the scene is huge. There can be numerous objects in a scene, along with a very high-definition spherical video for that scene, along with where each piece of video should be superimposed (e.g. matching the video of a moving individual in a scene with the three-dimensional model of that individual within the scene) in addition to other data. Volumetric video can exceed terabytes per minute in size. All of these objects with depth data are presented as a series of faces, discussed above. The more depth data represented as series of faces there is, the larger the resulting data that stores this volumetric video becomes.

The size of the data makes it difficult to render in a video frame. Even modern computers with high computational power may struggle to render each and every vertices for each and every face from frame to frame of volumetric video. Further, should one wish to "stream" volumetric video over, for example, an internet connection, it may not have sufficient bandwidth or, coupled with a slight delay, may significantly hinder smooth viewing of the volumetric video.

In traditional video streaming and encoding, the use of a "key frame" and pixel differences is known. In these types of systems, the bandwidth (and storage capacity) necessary to transmit or to store every pixel of every frame of video is unwieldy. As a result, clever programmers have discovered that in a high-speed frame of video (e.g. 24 frames per second), the number of dramatic changes in pixels from frame to frame is typically small. Only when a scene changes entirely or a hard cut is made in video do pixels dramatically shift. As can be imagined, a typical scene of video changes little from second-to-second. Most backgrounds remain the same or similar, the focus of the frame remains similar, and the colors for each pixel typically remain similar as well.

So, modern compression and encoding schemes for digital video utilize this understanding of the nature of video to encode "key frames" every so many frames (which may, itself, be dynamic) and for the frames of video in between to only encode the "differences" or "changes" for pixels that change. In most cases, those differences are relatively small (or non-existent) and the resulting encoded video is much smaller as a result. This is one of the techniques that enables very high resolution (e.g. 4K video) over typical network connections that have not dramatically improved in the last 10 years.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 2:
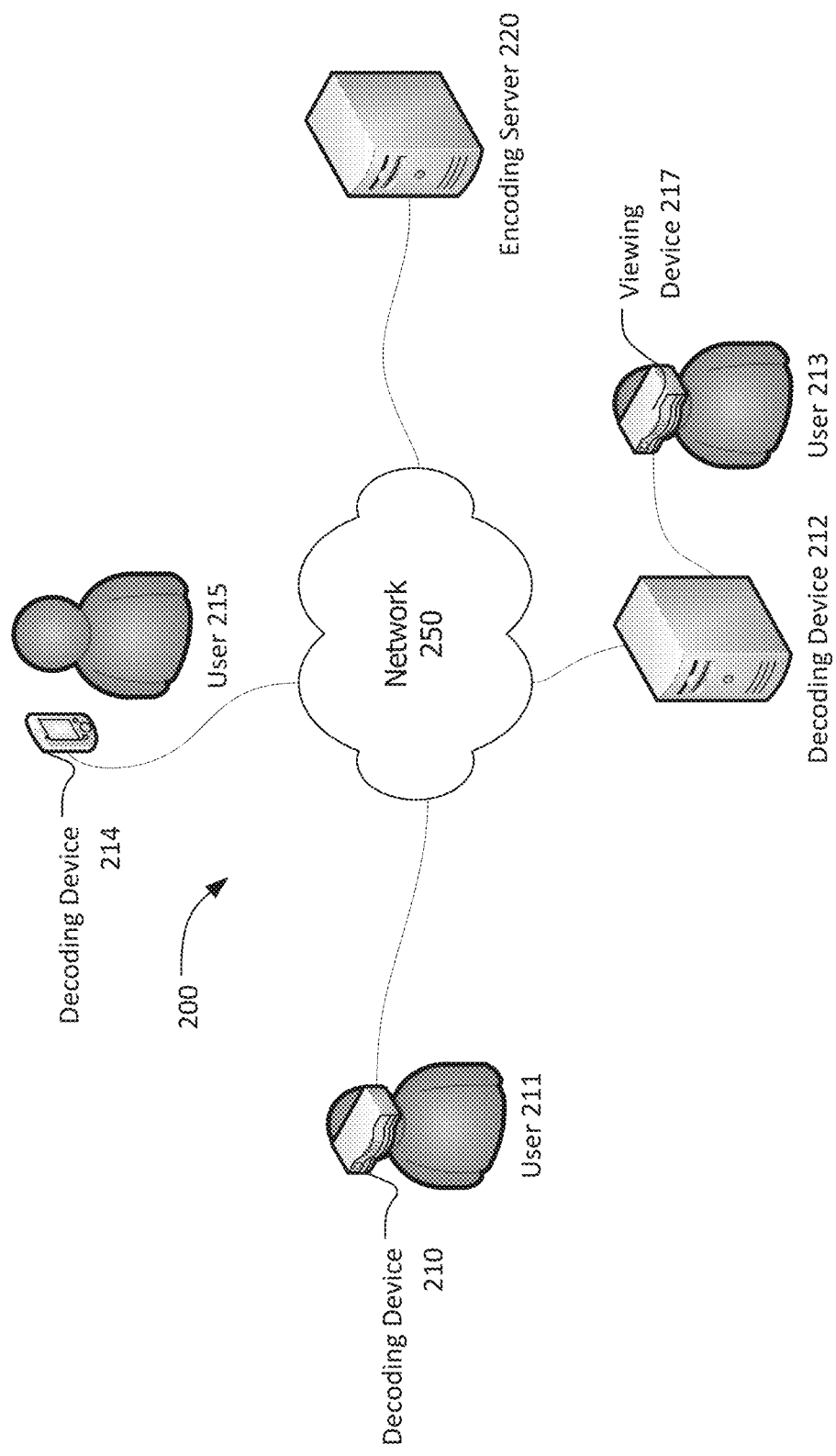
FIG. 2 is a block diagram of a system for streaming volumetric video for six degrees of freedom virtual reality.

Turning now to FIG. 2 a block diagram of a system 200 for streaming volumetric video for six degrees of freedom virtual reality is shown. The system 200 includes decoding devices 210, 212, and 214, along with the encoding server 220, all of which are interconnected by a network 150. Also shown are users 211, 213, and 215. The users 211, 213, and 215 are shown for example purposes, but are not a part of the system 200.

The decoding devices 210, 212, and 214 are devices including at least a processor that enables decoding of an encoded geometry sequence. The decoding devices 210, 212, and 214 also include or have access to a display for viewing virtual reality content (e.g. three-dimensional content whose view is altered as positional data is received to adjust to movements so as to present the three-dimensional content from the altered perspective). Decoding devices 210 and 214 are shown as stand-alone devices. Decoding devices 210 and 214 are, for example, a mobile device like mobile phones and tablets offered by companies such as Apple® and Google® Android® devices that are hand-held and stand alone or that may be placed within a headset like the Google® Daydream® or Cardboard® or the Merge® headset.

Decoding device 212 may be a computing device, such as a personal computer, that is used to perform the decoding. The decoding device 212 may operate in conjunction with a tethered viewing device 217, like a VR headset such as an HTC® Vive® or an Oculus® Rift. Decoding device 212 may be tethered because the decoding device 212 is a more-powerful computing device that provides rendering and data communication capabilities for the viewing device 217.

In the case of hand-held mobile devices or a mobile device VR headset like decoding devices 210 and 214, the mobile device incorporates a display, at least one processor, memory, orientation sensors such as a gravitometer, and motion sensors such as one or more gyroscopes. The mobile device may also include one or more back-facing cameras, depth sensors, LIDAR, infrared cameras or similar functionality that may be used to detect motion or head position. An external camera, LIDAR, infrared camera, or other external sensor may also be used to provide outside-in positional and motion data for the VR headset.

In the case of the viewing device 217 being tethered to a more-powerful computing device such as a decoding device 212, the VR headset may or may not have its own processor or memory, but will typically include one or more orientation and motion sensors and a display. The decoding devices 210, 212, and 214 may be connected, wired or wirelessly to an external camera, infrared camera, LIDAR or other depth or motion sensing device for tracking the decoding devices 210, 212, and 214 position, orientation, and motion.

Though the decoding devices 210, 212, are described as VR headsets or tethered to VR headsets, decoding devices like decoding device 214 may simply be a display for VR or AR content. For example, a tablet computer or mobile phone can act as a display that shows VR or AR content including volumetric video. In cases like this the display devices themselves differ little from actual VR headsets, but are merely not attached to a wearer's head. Instead, a user may hold the device up as somewhat of a portal to the world being viewed. It may still track motion, position and all the similar characteristics, while not affixed to a user's head. Examples of such devices include Google®'s Project Tango devices, more recent Google® Pixel® phones and Apple® iPhones incorporating ARKit functionality.

The encoding server 220 is a computing device that is responsible for accessing a geometry sequence, encoding it, packetizing the encoded geometry sequence, and transmitting it, via the network 250, to one or more of the decoding devices 210, 212, and 214. The encoding server 220 is or is one or more components of a computing device. While the encoding server 220 is shown as a single server, it may be or include a cloud-based, scalable infrastructure of multiple servers. The servers may be located in physical proximity to one another or may be spread around the world to better serve VR headset users in various locations with lower latency. The encoding server 220 (or servers) may include multiple graphics processing units (GPUs) to aid in simultaneous encoding of multiple sets of volumetric video at once for various environments experienced by VR headset users. Likewise, multiple central processing units (CPUs) may be used to orchestrate rendering for multiple decoding devices.

The encoding server 220 encodes basically in real-time in response to requests for volumetric video or geometry sequences from the decoding devices 210, 212, and 214. In such cases, motion, position, and orientation tracking of the decoding devices 210, 212, and 214 may form a part of the information provided to the encoding server 220 so as to encode the associated geometry sequences appropriately.

Or, the encoding server 220 may operate many days or months prior to any request for a geometry sequence to perform encoding of the associated geometry. In such cases, the geometry sequences may be provided to the decoding devices 210, 212, and 214 in response to a request. The decoding devices 210, 212, and 214 may perform some additional processing based upon positional, motion, or orientation data so as to "move about" in a three-dimensional environment created based upon the geometry sequences.

In some cases the encoding server 220 may be provided by one or more third party solutions for streaming video or a specialized service for both rendering volumetric video and streaming. The streaming solutions that are common today typically attempt to push streaming computing and transmission capabilities to the "edge" of the network so that they are as close as possible to the end user. This may me co-locating the encoding server 220 (or servers) as near as possible to an individual home or business where much use of the encoding server 220 is taking place. For example, services such as Netflix® place streaming servers, often their own streaming servers, at the head-end of a cable provider network. The "head-end" in this case being the last network "hop" before network traffic is dispersed to individual's homes or businesses. The encoding server 220 may, preferably, be at this last hop as well because this will serve to lower overall latency and response times for the encoding server 220.

The encoding server 220 includes an operating system and may include other, specialized software for accepting positional and orientational tracking data from one or more decoding devices 210, 212, and 214; and for encoding geometry sequences from, for example, volumetric video. The encoding server 220 may then transmit an encoded geometry sequence to one or more of the decoding devices 210, 212, and 214. Geometry sequences may be stored for later transmission after they are created in a similar fashion to stored versions of streamed video content is stored until it is requested by a viewing device.

The network 250 is a system that interconnects the encoding server 220 and the decoding devices 210, 212, and 214. The network 250 may be or include the internet. The network 250 may rely upon wireless networks such as 802.11x "WiFi" networks or a Bluetooth® network. For example, the decoding device 210 may be or include a mobile telephone which includes an 802.11x modem and a cellular modem. In situations in which 802.11x wireless is available, it may be preferred to long-term evolution (LTE") cellular data. This may be, in part, because cellular infrastructure is typically more latency and lower throughput than 802.11x. In contrast, viewing device 217 may be a VR headset that is tethered to a local computing device 212 with a wired Ethernet connection to a router that connects to the internet. In such a case, the VR headset 212 may prefer the available Ethernet connection for further improved latency and bandwidth throughput. The network 250 is or may be a mixed environment, using multiple technologies and protocols, depending on the particular implementation.

Figure 1:
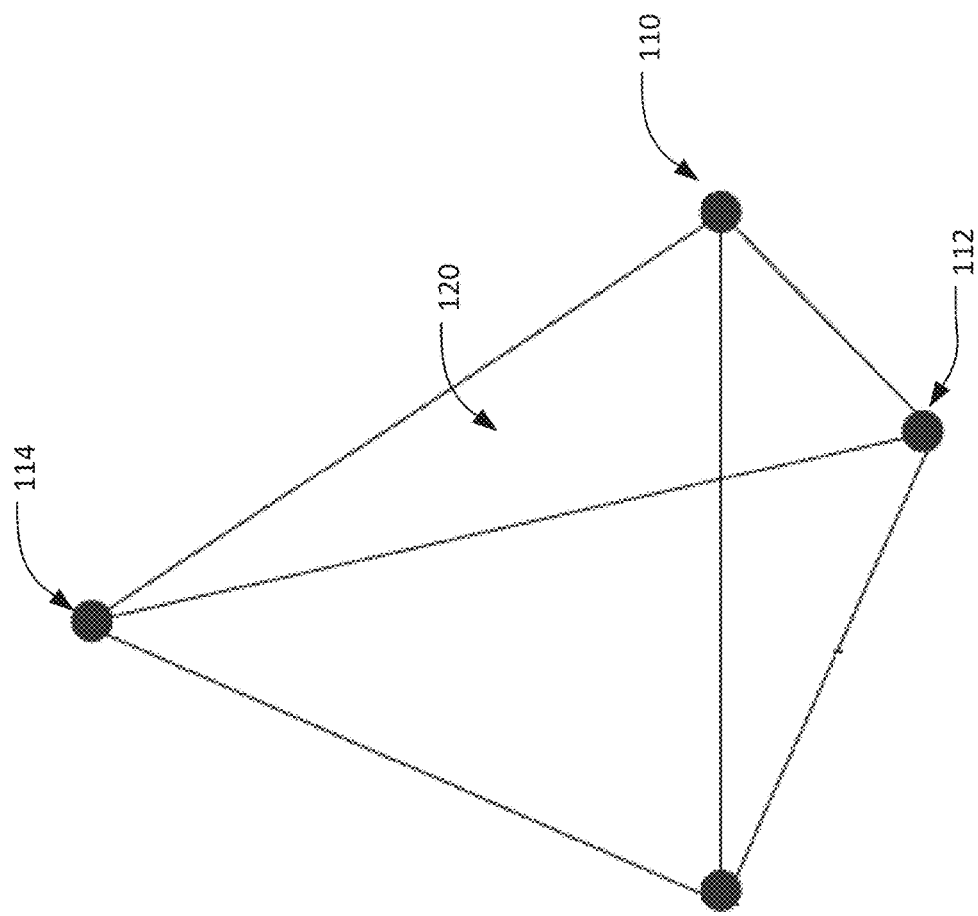
FIG. 1, discussed above, is an example of a triangular pyramid formed by a set of vertices making up a total of four faces.
Figure 3:
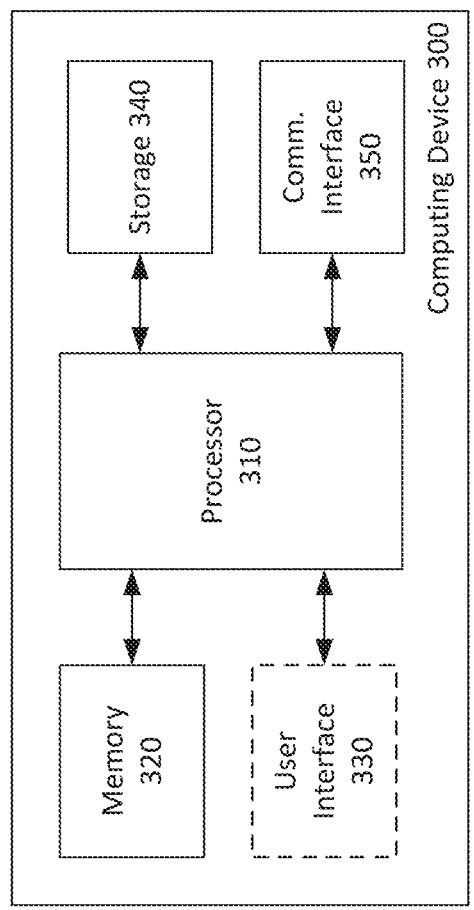
FIG. 3 is a block diagram of a computing device.

Turning now to FIG. 3, is a block diagram of an exemplary computing device 300, which may include the encoding server 220 of FIG. 1. Similarly, the decoding devices 210, 212, and 214 may include or may have access to (e.g. a tethered computer) a computing device 300. As shown in FIG. 3, the computing device 300 includes a processor 310, memory 320, optionally, a user interface 330, storage 340, and a communications interface 350. Some of these elements may or may not be present, depending on the implementation. Further, although these elements are shown independently of one another, each may, in some cases, be integrated into another.

The processor 310 may be or include one or more microprocessors, microcontrollers, digital signal processors, application specific integrated circuits (ASICs), or a system-on-a-chip (SOCs). The memory 320 may include a combination of volatile and/or non-volatile memory including read-only memory (ROM), static, dynamic, and/or magnetoresistive random access memory (SRAM, DRM, MRAM, respectively), and nonvolatile writable memory such as flash memory. The processor 210 may be multiple processors, each with independent functionality such as a CPU and a GPU and any number of co-processors for specialized functions. Likewise, the processor 210 may be multi-core with some processors being highly-efficient, while others are highly specialized or powerful. The processor (or a sub-processor) may include specialized registers, high-speed cache, or other specialized hardware or software to perform functions such as rendering video, generating three-dimensional worlds represented by the volumetric video, encoding or decoding video or audio and other, similar, specialized functions.

The memory 320 may temporarily or permanently store software programs and routines for execution by the processor. These stored software programs may include an operating system software. The operating system may include functions to support the communications interface 350, such as protocol stacks, encoding/decoding, compression/decompression, rendering, and encryption/decryption. The stored software programs may include an application or "app" to cause the computing device to perform portions of the processes and functions described herein. The word "memory", as used herein, explicitly excludes propagating waveforms and transitory signals.

The user interface 330, if present, may include a display and one or more input devices such as a touch screen, keypad, keyboard, stylus or other input devices. The user interface 330 may use the display to present user interfaces to an operator or other user of the computing device 300.

Storage 340 may be or include non-volatile memory such as hard disk drives, flash memory devices designed for long-term storage, writable media, and proprietary storage media, such as media designed for long-term storage of photographic or video data. The word "storage" as used herein explicitly excludes propagating waveforms and transitory signals The communications interface 350 may include one or more wired interfaces (e.g. a universal serial bus (USB), high definition multimedia interface (HDMI)), one or more connectors for storage devices such as hard disk drives, flash drives, or proprietary storage solutions. The communications interface 350 may also include a cellular telephone network interface, a wireless local area network (LAN) interface, and/or a wireless personal area network (PAN) interface. A cellular telephone network interface may use one or more cellular data protocols. A wireless LAN interface may use an 802.11x WiFi® wireless communication protocol or another wireless local area network protocol. A wireless PAN interface may use a limited-range wireless communication protocol such as Bluetooth®, WiFi®, Zig-Bee®, or some other public or proprietary wireless personal area network protocol. The cellular telephone network interface and/or the wireless LAN interface may be used to communicate with devices external to the computing device 300.

The communications interface 350 may include radio-frequency circuits, analog circuits, digital circuits, one or more antennas, and other hardware, firmware, and software necessary for communicating with external devices. The communications interface 250 may include one or more specialized processors to perform functions such as encoding/decoding, compression/decompression, and encryption/decryption as necessary for communicating with external devices using selected communications protocols. The communications interface 350 may rely on the processor 310 to perform some or all of these function in whole or in part.

As discussed above, the computing device 300 may be configured to perform geo-location, which is to say to determine its own location. Geo-location may be performed by a component of the computing device 300 itself or through interaction with an external device suitable for such a purpose. Geo-location may be performed, for example, using a Global Positioning System (GPS) receiver or by some other method.

Figure 4:
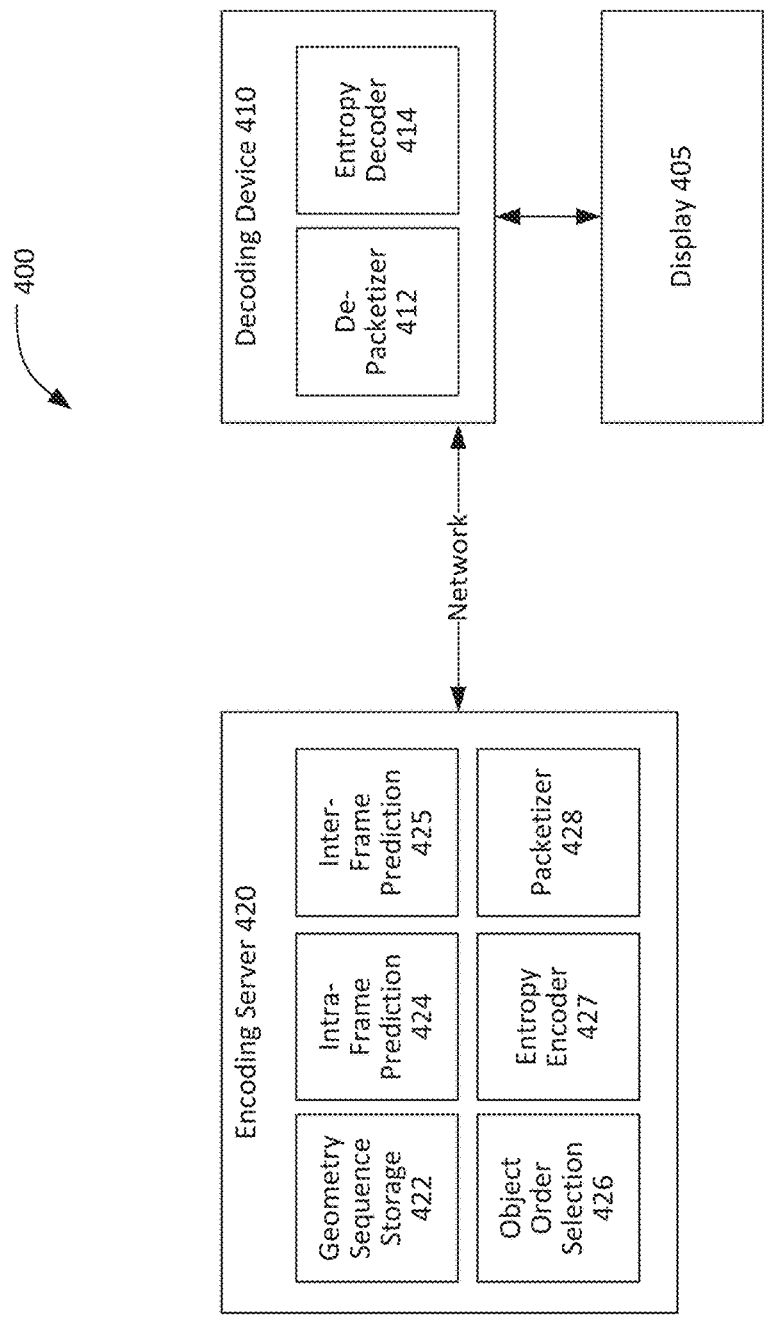
FIG. 4 is a functional diagram of a system for encoding and decoding geometry sequence data.

FIG. 4 is a functional diagram of a system 400 for encoding and decoding geometry sequence data. The system 400 includes an encoding server 420 and a decoding device 410, which may be decoding device 210 of FIG. 2, and a display 405. The display is shown as separate from the decoding device 410, but as discussed above, the display 405 may be integrated into the decoding device 410. The functions described in this system 400 may be implemented in software or in hardware or in a combination of both.

The encoding server 420 includes geometry sequence storage 422, intraframe prediction 424, interframe prediction 425, object order selection 426, an entropy encoder 427, and a packetizer 428.

The geometry sequence storage 422 may be memory or storage, as discussed above, for storing one or more geometry sequences. The geometry storage 422 may be local to the encoding server 420 or may be an external server or servers. The geometry storage 422 is described as storing geometry sequences, but may be a subset of a larger storage that stores the entirety of volumetric video and textures for use in volumetric video, in addition to geometry sequences.

The intraframe prediction 424 is software that attempts to discover similarities between faces formed by three vertices across a single frame of a geometry sequence. So, for example, the intraframe prediction 424 may recognize that a particular face is exactly reproduced multiple times in a single frame of a geometry sequence. If that face is exactly reproduced, all that need be stored about that face is its location in the three-dimensional environment and its color attributes. Ignoring replicated faces in a single frame of geometry data can save dramatic amounts of storage space and bandwidth when the associated geometry sequence is stored or transmitted.

However, the intraframe prediction 424 goes further. Many faces are not exactly the same. Instead, faces are similar or share characteristics, but are not identical. Comparisons between faces may be performed by directly measuring the differences between two faces, over and over. In this context, "differences" means the average vertices distance. There may be other measures of difference, such as overall area of a face, angle correspondence for the face, or other characteristics. But, as used herein "differences" means the average vertices distance between one face and another.

So, for example, face ABC may be compared to face DEF by measuring the distances that each segment of the triangle is different from the other. So, the segment AB is compared to DE. The segment BC is compared to EF and the segment CA is compared to FD. The differences may then be averaged to derive an overall "difference" between the two faces. However, triangles have three sides, so the same two faces may be compared three different ways. On a second pass, Segment BC is compared to DE, segment CA is compared to EF and segment AB is compared to FD. These differences are then averaged and compared to the average from the first comparison. The faces may be compared a third time by comparing segment CA to DE, AB to EF and BC to FD. These differences may be averaged.

These comparisons in the case of intraframe prediction occur all within a single frame. Once all of these averages are available, the average may be compared and the lowest selected as the most-alike. Across thousands or millions of faces, this may take place until the most-alike faces are discovered. Then, intelligent encoding may select (discussed below) the most-alike or the sets of most-alike faces that result in the most effective compression of the geometry sequence.

The interframe prediction 425 operates similarly, but on similar faces appearing within multiple frames of a given geometry sequence. As may be understood, the actual shape of an object in a geometry sequence changes relatively little from frame to frame. For example, the top of a desk within a scene has the same general shape from frame to frame unless that desk is destroyed, a drawer is opened, or some other unusual action occurs. Thus, the associated geometry data remains relatively constant.

Interframe prediction 425 relies upon these similarities to generate an index of "like" faces across multiple frame of geometry data from a geometry sequence. As with intraframe prediction, exact matches are easy to identify. Faces may also be compared, across frames in much the same way they were compared for intraframe prediction. Once the most-alike faces are identified, intelligent encoding can select which faces to encode fully (i.e. the vertices are all directly encoded) and which faces to encode with reference to other fully encoded vertices. This is discussed more fully below.

The object order selection 426 may re-order the storage of sets of vertices that make up one or more faces such that the faces are ordered in a way that maximizes the similarities between faces. The reordering does not alter the underlying shapes created, but if, for example, multiple objects of a similar type are stored as a geometry sequence, the data associated with those shapes may represented in the geometry data as a large table of vertices, for example, that is ordered into groups based upon each individual three-dimensional object. That index may be re-ordered, without altering the shapes represented, so that vertices making up particular faces that are of similar size and shape are placed near one another. This intelligent reordering enables easier comparison of faces for the intraframe prediction 424 and interframe prediction 425 to operate. Alternatively, the faces may be ordered based upon their distance from a fixed point, such as the origin (0, 0, 0) in the (x, y, z) paradigm. Typically, the closer objects are the (0, 0, 0), the more-alike they are in size and shape and location. Less data need be encoded to represent transforms of similar faces that are nearby one another in a given geometry sequence.

These indexes may be reordered for a single "frame" of a geometry sequence, or they may be reordered across an entire geometry sequence so that, in abstract terms, the index becomes a matrix where ready comparisons down the index itself, and across the matrix become relatively simple for the encoding server 420 to perform. In this way, similarities both within a frame (intraframe prediction) and within a series of frames (interframe prediction) may be more apparent.

The entropy encoder 427 takes an index and residual obtained from both the intraframe prediction 424 and the interframe prediction 425 and uses two variants of an arithmetic coder to perform encoding. The first variant is a so-called "normal" arithmetic coder with a fixed probability model that may encode the index array created by both the intraframe prediction 424 and the interframe prediction 425. The entropy encoder 427 may also utilize an adaptive arithmetic coder that relies upon selective probability models to encode the residual array. Using two models enables the entropy encoder 427 to select the model that results in the highest compression. A flag may be set by the entropy encoder 427 to alert a later decoder as to which method was selected for a given geometry sequence. Though only adaptive and normal arithmetic coding is discussed, other encoding methods may be employed.

The packetizer 428 is responsible for creating packets of data for transmission of the encoded geometry sequence to the decoding device 410. The index and residual bit streams that result from the entropy encoder 427 may be packetized along with other decoding parameters such as a reference frame identifier (e.g. which frame is associated with this stream). The packetizer 428 may be integral to the encoding process, or may be provided in whole or in part by networking components resident in the encoding server 420.

The associated packet forms used for the encoded geometry sequence that are formed by the packetizer 428 and decoded by the de-packetizer 412 (discussed below) are relevant to this discussion. All packets begin with a fixed-size packet header of 6 bytes with the word "HYPEVR" that is used to indicate that these packets are related to an encoded geometry sequence. The second field of each packet is an 8-bit value that identifies a packet type between 0 and 255. In this field, a sequence parameter packet has a value of 0, a frame parameter packet has a value of 1, and a component parameter packet has a value of 2. The packet payload follows this packet header. The packet payload includes one of a sequence parameter, a frame parameter, and a component parameter, depending on the packet type identified by the second field.

A sequence parameter packet has information describing the entire geometry sequence. This data includes the total number of frames in the sequence, the maximum number of vertices in any frame, texture image width, and texture image height. The entropy decoding device 410 keeps track of the current number of frames received and stops the decoding of a given geometry sequence when the counter of frames reaches the total number of frames identified in the sequence parameter. The other aspects of this parameter are used to allocate sufficient memory to store the associated geometry sequence for decoding.

A frame parameter packet includes data related to a particular geometry frame. This data includes a frame identification, the number of vertices within a frame, the number of components that make up the frame. The frame parameter packet also enables the decoding device 410 to properly re-order frames received out of order using the frame identification. The number of vertices within the frame enables the entropy decoder 414 to find an appropriate termination point. The number of components informs the entropy decoder 414 regarding the number of component parameter packets to expect based upon the number of components in the associated frame.

Finally, the payload of a component parameter packet contains a compressed component along with any auxiliary parameters for the component. The fields in a component parameter packet include a frame identification, a component identification, a prediction method (e.g. interframe or intraframe), a reference frame ID (for interframe prediction), a probability model identification, an entropy coding method used and the number of bits used for the encoding. The coded bit streams follow these parameter fields. The start point of an encoded bit stream may be ascertained based upon the expected fields and their length. The entropy decoder 414 may extract the bit stream from the component parameter packet by knowing this relationship.

The frame identification and component identification fields are for identifying the component itself and to enable the decoder to perform reverse interframe prediction for components in other frames. The prediction method takes on two values, 0 for intraframe prediction and 1 for interframe prediction. Decoder uses prediction method to determine reverse prediction path. Reference frame identification is used to determine reference frame if interframe prediction is selected. The entropy coding method field is an 8-bit value that supports 256 distinct entropy coding algorithms. For example, if arithmetic coding is used, value 0 is assigned. During entropy decoding, the decoder retrieves probability model that was used for encoding through the probability model identification and correctly restore the values.

The decoding device 410 includes a de-packetizer 412, an entropy decoder 414, objection reconstruction 416, and an object merger 418.

The depacketizer 412 reverses the packetization generated by the packetizer 428 to recreate the index and residual from the bitstream.

The entropy decoder 414 identifies the encoding type based upon the flag set by the entropy encoder 427 to determine the type of prediction used. If intraframe prediction was used, the entropy decoder uses the index value to locate a reference face within the same frame and ads the residual onto the reference face to restore the properties of each associated face. If interframe prediction was used, the index value and frame identification is used to locate the reference face within the reference frame and the residual is used to restore the properties of the face being decoded.

Description of Processes

Figure 5:
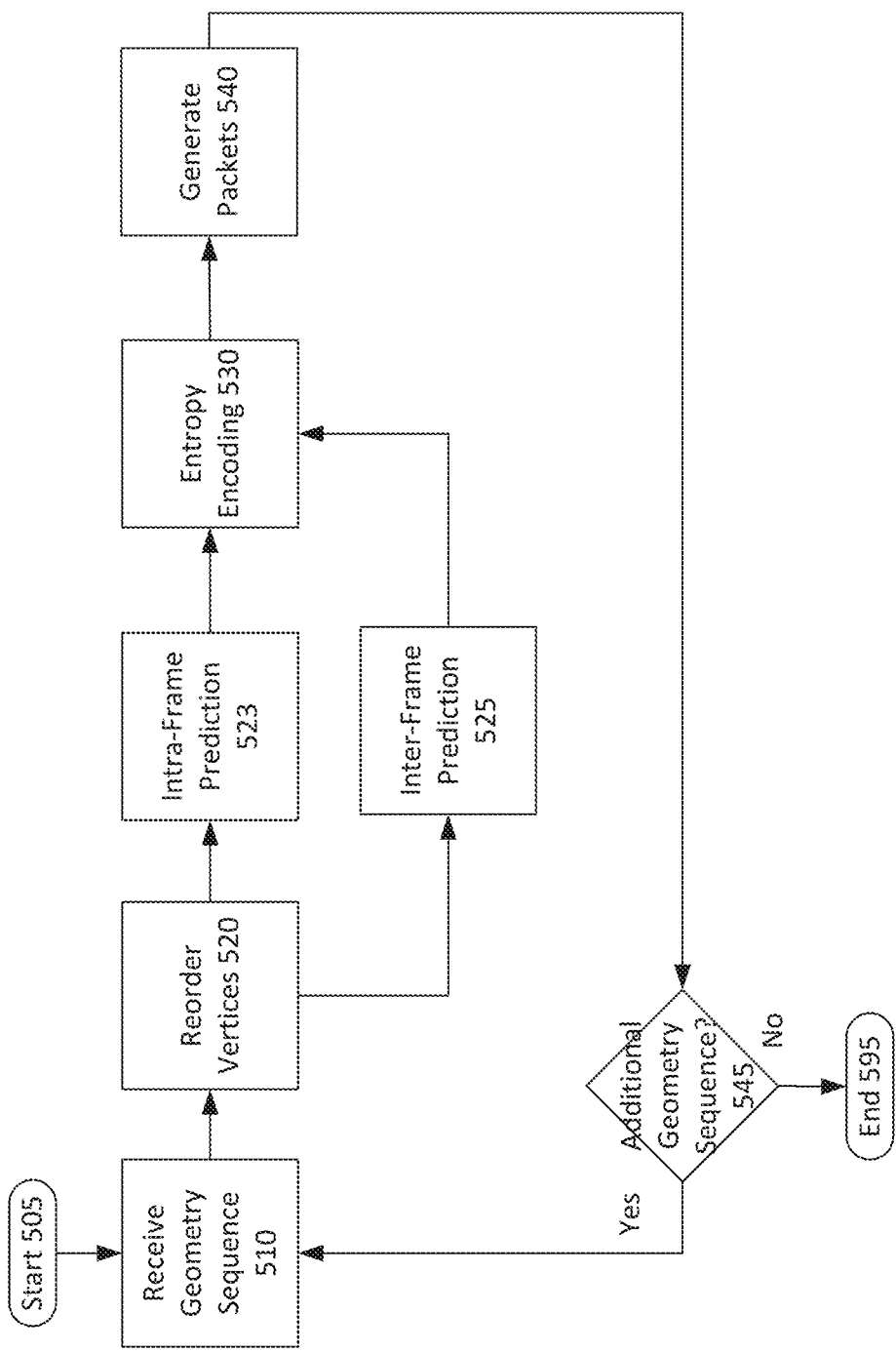
FIG. 5 is a flowchart for a method of encoding geometry sequence data.

Referring now to FIG. 5 a flowchart for a method of encoding geometry sequence data is shown. The method begins at 505 and ends at 595, but may take place for many geometry sequences in a row and may continue until no more encoding is required.

After the start 505, a geometry sequence is received at 510. This geometry sequence, as discussed above, is an ordered series of frames of geometry data. Though shown as "received" this is intended to indicate that the encoding server 220 receives the geometry sequence. That may be received from memory, storage, over a network, or from other sources. Receipt does not necessarily mean that the encoding server 220 did not already have access to the geometry sequence, merely that encoding has been requested and access to the geometry sequence has taken place.

Next, at 520, the vertices may be reordered. The vertices may be sorted so that vertices near the origin (0, 0, 0) are placed at the top of the index. Other orderings may be found to be more efficient. This ordering enables comparison between vertices that have been found to be similar to one another. Specifically, faces with vertices near the origin tend to share characteristics.

Next, both intraframe prediction at 523 and interframe prediction at 525 are performed substantially simultaneously. Intraframe prediction is discussed above and relies upon selecting index faces and residual faces from within a single frame. Interframe prediction relies upon selecting an index face from somewhere within the geometry sequence and forming residual faces therefrom. Depending on the characteristics of the geometric sequence being encoded, one or the other may be significantly more efficient at compression.

Next, at 530, entropy encoding takes place. Here, the entropy encoder 427 selects which of the intraframe prediction 523 and interframe prediction 525 to use based upon the one that provides the most compression. The entropy encoder also selects the type of encoding to use and sets associated packet flags so that the encoding method may be ascertained by a decoder. The results of the entropy encoding is an encoded bitstream for a series of frames of a geometry sequence.

Next, at 540, the packets of data may be generated. The form of those packets is discussed more fully above with reference to the packetizer 428.

Finally, a determination is made whether there is an additional geometry sequence to encode at 545. If not ("no" at 545), then the process ends at 595. If so ("yes" at 545), then the process continues with receipt of new geometry sequence 510.

Figure 6:
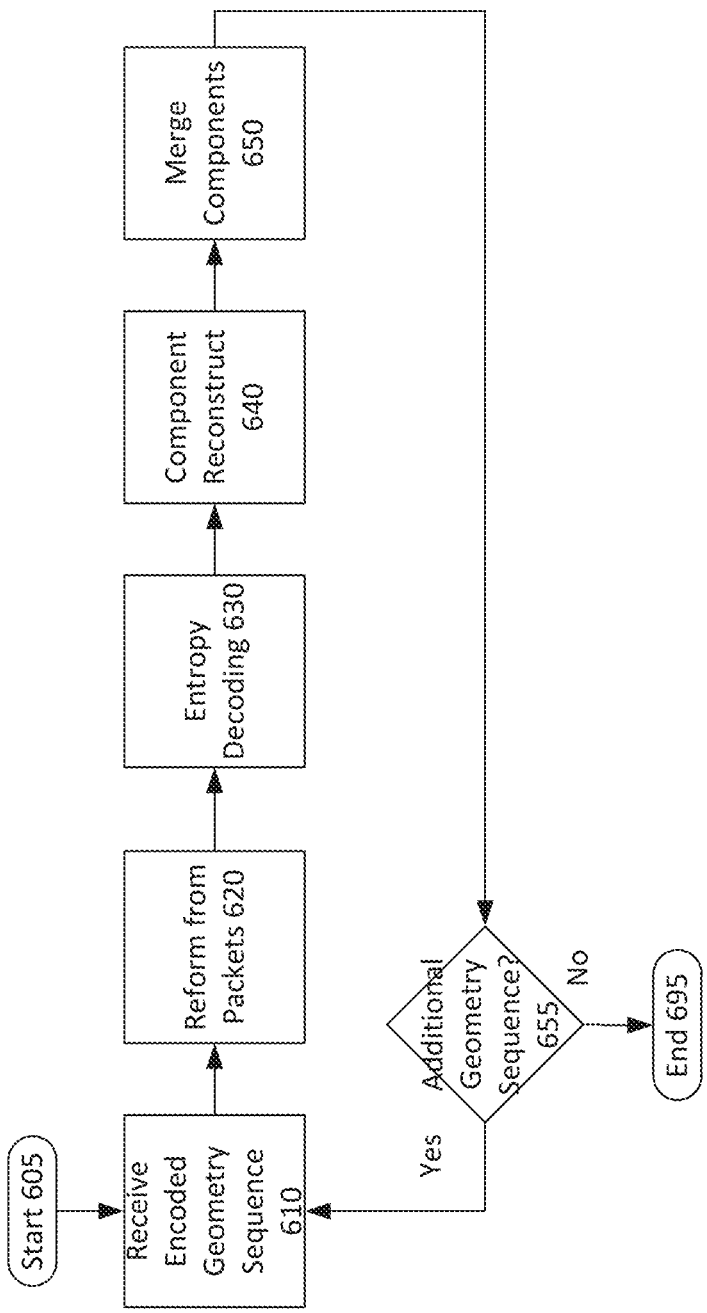
FIG. 6 is a flowchart for a method of decoding geometry sequence data.

Turning now to FIG. 6, a flowchart for a method of decoding geometry sequence data is shown. The method begins at 605 and ends at 695, but may take place for many geometry sequences in a row and may continue until no more decoding is required.

After the start at 505, the process begins with receipt of an encoded geometry sequence at 610. This receipt may be identified by a packet including the HYPEVR header along with a payload of associated geometry sequence data.

The packets are reformed at 620 by pulling the encoded bitstream from the payloads of geometry sequence packets and by capturing the associated field information so that the bitstream and its characteristics may begin to be re-formed by the decoding device.

At 630, entropy decoding is performed. This decoding relies upon the field information identifying the type of encoding used and the type of prediction method used (intraframe or interframe) and reverses the selected encoding and prediction method by performing inverse operations on the associated bitstream.

At 640, this results in the re-creation of the associated components, which may then be merged to create an entire geometry sequence that may be re-created by a display associated with a decoding device. This recreation may result in a geometry sequence that is a portion of a volumetric video that may be viewed by an individual.

Finally, at 655, a determination is made whether there are additional geometry sequences to decode. If not ("no" at 655), then the process ends at 695. If so ("yes" at 655), then the process continues with receipt of an additional encoded geometry sequence at 610.

The flow chart has both a start 305 and an end 395, but the process is cyclical in nature.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for encoding and decoding geometry sequences comprising:
    an encoding server configured to:
        receive a first frame and a second frame of a geometry sequence describing a three-dimensional virtual environment, each including at least one object having three dimensions, wherein geometry data including (x, y, z) coordinates for each of a set of at least three vertices defines each face of the at least one object;
        detect a first face in the first frame and a second face in the second frame that share three-dimensional characteristics;
        calculate a first translation from a first position of the first face and a second position of the second face;
        use the translation as an estimated translation of other faces from the first frame in the second frame;
        calculate as translated differences a change relative to the estimated translation for each of the other faces based upon the estimated translation from the first frame to the second frame; and
        encode, as an encoded geometry sequence, the geometry data for the first face and, encode only differences between the geometry for the second face and the geometry of the first face and the translated differences for the other faces based upon the estimated translation.

2. The system of claim 1, wherein the encoder is further configured to:
    detect at least two faces in the first frame, each formed by at least three of the set of vertices, that share characteristics; and
    encode, into the encoded volumetric video, the geometry data for one of the at least two faces and, for the other of the at least two faces, encode only differences from the geometry data.

3. The system of claim 1 where in a remote computing device comprises:
    a remote network interface for receiving the encoded geometry sequence; and
    a decoding device configured to:
        decode the first face from the encoded geometry sequence by generating the first face within a decoded three-dimensional virtual environment according to the geometry data; and
        decode the second face from the encoded geometry sequence by generating the second face within the decoded three-dimensional virtual environment according to the geometry data for the first face and the differences and the translated differences for the other faces based upon the estimated translation.

4. The system of claim 2 further comprising:
    a remote network interface configured to receive the encoded geometry sequence; and
    a decoding server configured to:
        decode the one of the at least two faces from the encoded geometry sequence by generating the one of the at least two faces within a decoded three-dimensional virtual environment according to the geometry data; and
        decode the other of the at least two faces from the encoded geometry sequence by generating the other of the at least two faces within the decoded three-dimensional virtual environment according to the geometry data for the one face and the differences.

5. The system of claim 1 wherein the encoding server is further configured to:
    compare the first face and the second face using average vertices distances; and
    identify the first face and the second face as sharing three-dimensional characteristics when the average vertices distances are smallest between the first face and the second face as compared to other faces in the geometry sequence.

6. The system of claim 2 wherein the encoding server is further configured to select either (1) the first face and differences or (2) the one of the at least two faces and the differences for transmission as the encoded geometry sequence.

7. A method for encoding and decoding geometry sequences for volumetric three-dimensional video comprising:
    receiving a first frame and a second frame of volumetric video describing a three-dimensional virtual environment, each including at least one object having three dimensions, wherein geometry data including (x, y, z) coordinates for each of a set of at least three vertices defines each face of the at least one object;
    detecting a first face in the first frame and a second face in the second frame that share three-dimensional characteristics;
    calculating a first translation from a first position of the first face and a second position of the second face;
    using the translation as an estimated translation of other faces from the first frame in the second frame;
    calculating as translated differences a change relative to the estimated translation for each of the other faces based upon the estimated translation from the first frame to the second frame; and encoding, as encoded geometry sequence, the geometry data and the color component for the first face and, encode only differences between the geometry for the second face and the geometry of the first face and the translated differences for the other faces based upon the estimated translation.

8. The method of claim 7 further comprising:
detecting at least two faces in the first frame, each formed by at least three of the set of vertices, that share characteristics; and
encoding, into the encoded geometry sequence, the geometry data for one of the at least two faces and, for the other of the at least two faces, encode only differences from the geometry data.

9. The method of claim 7 further comprising:
receiving the encoded geometry sequence;
decoding the first face from the encoded geometry sequence by generating the first face within a decoded three-dimensional virtual environment according to the geometry data; and
decoding the second face from the encoded geometry sequence by generating the second face within the decoded three-dimensional virtual environment according to the geometry data for the first face and the differences and the translated differences for the other faces based upon the estimated translation.

10. The method of claim 8 further comprising:
receiving the encoded geometry sequence;
decoding the one of the at least two faces from the encoded geometry sequence by generating the one of the at least two faces within a decoded three-dimensional virtual environment according to the geometry data; and
decoding the other of the at least two faces from the encoded geometry sequence by generating the other of the at least two faces within the decoded three-dimensional virtual environment according to the geometry data for the one face and the differences.

11. The method of claim 7 further comprising:
comparing the first face and the second face using average vertices distances; and
identifying the first face and the second face as sharing three-dimensional characteristics when the average vertices distances are smallest between the first face and the second face as compared to other faces in the geometry sequence.

12. The method of claim 8 further comprising selecting either (1) the first face and differences or (2) the one of the at least two faces and the differences for transmission as the encoded geometry sequence.

13. Apparatus comprising a non-transitory storage medium storing a program having instructions which when executed by a processor will cause the processor to encode geometry sequences, the instructions of the program for:
receiving a first and a second frame of volumetric video describing a three-dimensional virtual environment, each including at least one object having three dimensions, wherein geometry data including (x, y, z) coordinates for each of a set of at least three vertices defines each face of the at least one object;
detecting a first face in the first frame and a second face in the second frame that share three-dimensional characteristics
calculating a first translation from a first position of the first face and a second position of the second face;
using the translation as an estimated translation of other faces from the first frame in the second frame;
calculating as translated differences a change relative to the estimated translation for each of the other faces based upon the estimated translation from the first frame to the second frame; and
encoding, as encoded geometry sequence, the geometry data for the first face and, encode only differences between the geometry for the second face and the geometry of the first face and the translated differences for the other faces based upon the estimated translation.

14. The apparatus of claim 13 wherein the instructions of the program are further for:
detecting at least two faces in the first frame, each formed by at least three of the set of vertices, that share characteristics; and
encoding, into the encoded geometry sequence, the geometry data and the color component for one of the at least two faces and, for the other of the at least two faces, encode only differences from the geometry data.

15. The apparatus of claim 13 further comprising an additional non-transitory storage medium storing a second program having instructions which when executed by a separate processor will cause the separate processor to decode geometry sequences, the instructions of the second program for:
receiving the encoded geometry sequence;
decoding the first face from the encoded geometry sequence by generating the first face within a decoded three-dimensional virtual environment according to the geometry data; and
decoding the second face from the encoded geometry sequence by generating the second face within the decoded three-dimensional virtual environment according to the geometry data for the first face and the differences and the translated differences for the other faces based upon the estimated translation.

16. The apparatus of claim 15 wherein the instructions of the second program are further for:
receiving the encoded geometry sequence;
decoding the one of the at least two faces from the encoded geometry sequence by generating the one of the at least two faces within a decoded three-dimensional virtual environment according to the geometry data; and
decoding the other of the at least two faces from the encoded geometry sequence by generating the other of the at least two faces within the decoded three-dimensional virtual environment according to the geometry data for the one face and the differences.

17. The apparatus of claim 13 wherein the instructions of the program are further for:
comparing the first face and the second face using average vertices distances; and
identifying the first face and the second face as sharing three-dimensional characteristics when the average vertices distances are smallest between the first face and the second face as compared to other faces in the geometry sequence.

18. The apparatus of claim 14 wherein the instructions of the program are further for selecting either (1) the first face and differences or (2) the one of the at least two faces and the differences for transmission as the encoded geometry sequence.

19. The apparatus of claim 13 further comprising:
a processor, and
a memory, wherein the processor and the memory comprise circuits and software for performing the instructions on the storage medium.

\* \* \* \* \*